United States Patent
Kato et al.

(10) Patent No.: US 8,580,868 B2
(45) Date of Patent: Nov. 12, 2013

(54) WATER-BASED INK COMPOSITION, INK SET AND IMAGE FORMING METHOD

(75) Inventors: Takahiro Kato, Kanagawa (JP); Akio Tamura, Kanagawa (JP); Takahiro Ishizuka, Kanagawa (JP); Terukazu Yanagi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 614 days.

(21) Appl. No.: 12/541,183

(22) Filed: Aug. 14, 2009

(65) Prior Publication Data

US 2010/0075044 A1  Mar. 25, 2010

(30) Foreign Application Priority Data

Sep. 24, 2008 (JP) ................. 2008-244813

(51) Int. Cl.
*C08L 67/06* (2006.01)

(52) U.S. Cl.
USPC ........... 523/160; 523/161; 427/256; 524/539; 524/502

(58) Field of Classification Search
USPC .............................. 523/160, 161; 33/160, 161
See application file for complete search history.

(56) References Cited

U.S. PATENT DOCUMENTS

| | | | | |
|---|---|---|---|---|
| 5,254,158 A | * | 10/1993 | Breton et al. | 106/31.58 |
| 6,022,104 A | * | 2/2000 | Lin et al. | 347/102 |
| 6,262,207 B1 | * | 7/2001 | Rao et al. | 526/224 |
| 7,244,774 B2 | * | 7/2007 | Tanaka et al. | 523/160 |
| 2003/0069329 A1 | | 4/2003 | Kubota et al. | |
| 2004/0116553 A1 | * | 6/2004 | Nakamura et al. | 523/160 |
| 2006/0100306 A1 | * | 5/2006 | Yau et al. | 523/160 |
| 2007/0066711 A1 | * | 3/2007 | Fasano et al. | 523/160 |
| 2008/0011189 A1 | * | 1/2008 | Hiraoka et al. | 106/31.6 |

FOREIGN PATENT DOCUMENTS

| | | |
|---|---|---|
| EP | 1201719 A1 | 5/2002 |
| EP | 1371697 A | 12/2003 |
| JP | 2000-7961 A | 1/2000 |
| JP | 2001-329199 A | 11/2001 |
| JP | 2005-023247 A | 1/2005 |
| JP | 2005-171223 A | 6/2005 |
| JP | 2006-273892 A | 10/2006 |
| JP | 2007-77371 * | 3/2007 |
| WO | 2006/046759 A1 | 5/2006 |

OTHER PUBLICATIONS

Machine translation of JP 2007-77371.*
Corresponding EPO Official communication.

* cited by examiner

*Primary Examiner* — Doris Lee
(74) *Attorney, Agent, or Firm* — Solaris Intellectual Property Group, PLLC

(57) ABSTRACT

The invention provides a water-based ink composition including: a water-based medium, a colored particle containing a pigment and a water-insoluble polymer dispersant, and a self-dispersing polymer particle including a hydrophilic constituent unit, and a hydrophobic constituent unit derived from alicyclic (meth)acrylate, as well as an ink set comprising the water-based ink composition, and an image forming method using the aqueous ink composition or the ink set.

14 Claims, No Drawings

WATER-BASED INK COMPOSITION, INK SET AND IMAGE FORMING METHOD

CROSS-REFERENCE TO RELATED APPLICATION

This application claims priority under 35 USC 119 from Japanese Patent Application No. 2008-244813 filed on Sep. 24, 2008, the disclosure of which is incorporated by reference herein.

BACKGROUND OF THE INVENTION

1. Field of the Invention

The present invention relates to a water-based ink composition, an ink set and an image forming method.

2. Description of the Related Art

In recent years, by enhancement of needs such as source protection, environment conservation, and improvement in stability of work, conversion of a paint and an ink into an aqueous paint and an aqueous ink is progressing. Quality required for the aqueous paint and the aqueous ink includes fluidity, storage stability, luster of a film, clearness, and a coloring force like an oily paint and an oily ink. However, since a majority of pigments are remarkably inferior in suitability such as pigment dispersibility in an aqueous vehicle as compared with oily ones, satisfactory quality is not obtained by a normal dispersing method. Use of various additives, for example, a resin for an aqueous pigment-dispersion and an surfactant has been studied, but an aqueous paint or an aqueous ink which satisfies the all suitabilities, and is comparable to the current oily paint or oily ink having high quality has not been obtained.

In order to solve such problems, for example, a water-based ink composition containing a coloring material covered with a water-insoluble polymer as a colorant, and a polymer particle is disclosed (see e.g. Japanese Patent Application Laid-Open (JP-A) No. 2001-329199). An inkjet ink using the water-based ink composition is said to be excellent in water resistance, scratch resistance, marker resistance, and printability.

In addition, an ink composition containing at least a coloring material covered with a water-insoluble polymer as a colorant, and a resin emulsion as an additive, wherein a weight average molecular weight of the water-insoluble polymer is 50000 to 150000, and the resin emulsion includes a polymer having constituent components having the same structure as that of a water-insoluble polymer, and having a molecular weight expressed as the weight average molecular weight which is 1.5 times to 4 times the weight average molecular weight of the water-insoluble polymer is disclosed (see e.g. Japanese Patent Application Laid-Open (JP-A) No. 2006-273892), and the ink is stated to be good in luster and scratch resistance.

SUMMARY OF THE INVENTION

The present invention has been made in view of the above circumstance and provides a water-based ink composition, an ink set and an image forming method.

A first aspect of the present invention provides

A water-based ink composition including a water-based medium, a colored particle containing a pigment and a water-insoluble polymer dispersant, and a self-dispersing polymer particle containing a hydrophilic constituent unit, and a hydrophobic constituent unit derived from alicyclic (meth) acrylate.

A second aspect of the present invention provides the ink set including at least one kind of the water-based ink composition as defined in the first aspect of the invention.

A third aspect of the present invention provides an image forming method including an ink imparting step of using the water-based ink composition as defined in the first aspect of the invention, or the ink set as defined in the second aspect of the invention to impart the water-based ink composition on a recording medium.

DETAILED DESCRIPTION OF THE INVENTION

<Water-based Ink Composition>

The water-based ink composition of the present invention (hereinafter, simply referred to as "ink composition" in some cases) contains a water-based medium, at least one kind of colored particle including a pigment and a water-insoluble polymer dispersant, and at least one kind of self-dispersing polymer particle including a hydrophilic constituent unit and a hydrophobic constituent unit derived from alicyclic (meth) acrylate.

By such constitution, a water-based ink composition which is excellent in stability over time with respect to viscosity change and particle diameter change, and is good in fixability and blocking resistance of a formed image may be obtained. And, when the water-based ink composition having such the constitution is applied to, for example, an inkjet recording method, ejecting property of the ink is also excellent.

[Colored Particle]

The colored particle in the invention includes at least one kind of pigment, and at least one kind of water-insoluble polymer dispersant, and it is preferable that the pigment is included in the colored particle in a state where it is covered with the water-insoluble polymer dispersant. The colored particle may contain other components, if necessary, in addition to the pigment and the water-insoluble polymer dispersant.

(Pigment)

As the pigment in the invention, a kind thereof is not particularly limited, but conventionally known organic and inorganic pigments may be used. Examples include organic pigments including polycyclic pigments such as an azo lake, an azo pigment, a phthalocyanine pigment, a perylene and a perynone pigment, an anthraquinone pigment, a quinacridone pigment, a dioxazine pigment, a diketopyrrolopyrrole pigment, a thioindigo pigment, an isoindolinone pigment, and a quinophthalone pigment, dye lakes such as a basic dye-type lake, and an acidic dye-type lake, a nitro pigment, a nitroso pigment, aniline black, and a daylight fluorescent pigment, and inorganic pigments such as titanium oxide, iron oxide, and carbon black. In addition, even pigments not described in the color index may be all used as far as they are dispersible in an aqueous phase. Further, the pigments having a surface treated with a surfactant or a polymer dispersant, and graft carbon may be of course used. Among the pigments, from the viewpoint of ink coloring property, organic pigments, and carbon black-based pigments are particularly preferably used.

Specific examples of the organic pigment used in the invention are described below.

Examples of the organic pigment for orange or yellow include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 151, C.I. Pigment Yellow 155, C.I. Pigment Yellow 180 and C.I. Pigment Yellow 185.

Examples of the organic pigment for magenta or red include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 222 and C.I. Pigment Violet 19.

Examples of the organic pigment for green or cyan include C.I. Pigment Blue 15, C.I. Pigment Blue 15:2, C.I. Pigment Blue 15:3, C.I. Pigment Blue 15:4, C.I. Pigment Blue 16, C.I. Pigment Blue 60, C.I. Pigment Green 7, and siloxane-crosslinked aluminum phthalocyanine described in U.S. Pat. No. 4,311,775.

Examples of the organic pigment for black include C.I. Pigment Black 1, C.I. Pigment Black 6 and C.I. Pigment Black 7.

The pigments may be used alone, or a plurality of them may be used together.

The content of the pigment in the colored particle is preferably 0.1% by mass to 20% by mass, more preferably 0.2% by mass to 15% by mass, and particularly preferably 0.5% by mass to 10% by mass based on the total solid matter mass, from the viewpoints of ink coloring property, and storage stability.

(Water-insoluble Polymer Dispersant)

The water-insoluble polymer dispersant (hereinafter, simply referred to as "dispersant" in some cases) in the invention is not particularly limited as far as it is a water-insoluble polymer which may disperse the pigment, and conventionally known water-insoluble polymer dispersant may be used. The water-insoluble polymer dispersant may be constructed to comprise, for example, both of a hydrophobic constituent unit and a hydrophilic constituent unit.

Examples of a monomer constituting the hydrophobic constituent unit include styrene-based monomer, alkyl (meth)acrylate, and aromatic group-containing (meth)acrylate.

The monomer constituting the hydrophilic constituent unit is not particularly limited as far as it is, a monomer including a hydrophilic group. Examples of the hydrophilic group include a nonionic group, a carboxy group, a sulfonic acid group, and a phosphoric acid group. The nonionic group has the same meaning as that of a nonionic group in a self-dispersing polymer described later.

The hydrophilic constituent unit in the invention preferably includes at least a carboxy group, and an embodiment in which the unit includes both of a nonionic group and a carboxy group is also preferable.

Examples of the water-insoluble polymer dispersant include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate-(meth)acrylic acid copolymer, and a styrene-maleic acid copolymer.

Herein, the "(meth)acrylic acid" means acrylic acid or methacrylic acid.

In the invention, from the viewpoint of dispersion stability of the pigment, the water-insoluble polymer dispersant is preferably a vinyl polymer containing a carboxy group, more preferably a vinyl polymer having at least a constituent unit derived from an aromatic group-containing monomer as the hydrophobic constituent unit, and a constituent unit containing a carboxy group as the hydrophilic constituent unit.

The weight average molecular weight of the water-insoluble polymer dispersant is preferably 3,000 to 200,000, more preferably 5,000 to 100,000, further preferably 5,000 to 80,000, and particularly preferably 10,000 to 60,000, from the viewpoint of dispersion stability of the pigment.

The content of the dispersant in the colored particle in the invention is preferably 5% by mass to 200% by mass, more preferably 10% by mass to 100% by mass, particularly preferably 20% by mass to 80% by mass based on the pigment, from the viewpoints of dispersibility of the pigment, ink coloring property, and dispersion stability.

By the content of the dispersant in the colored particle being in the range, the pigment is covered with the suitable amount of the dispersant, and a colored particle which has a small particle diameter and is excellent in stability over time is tends to be easily obtained, being preferable.

The colored particle in the invention may contain other dispersants in addition to the water-insoluble polymer dispersant. For example, conventionally known water-soluble low molecular dispersant and water-soluble polymer may be used. The the dispersant other than the water-insoluble polymer dispersant may be used within the range of the content of the dispersant.

(Other Additives)

If necessary, other additives such as a basic substance (neutralizer) and a surfactant may be added to the colored particle.

(Basic Substance)

As the basic substance, a neutralizer (organic base or inorganic alkali) may be used. For the purpose of neutralizing the dispersant, the basic substance is added so that the pH of a composition containing the dispersant is preferably 7 to 11, and more preferably of 8 to 10.

The content of the basic substance is preferably 50 mol % to 150 mol %, more preferably 70 mol % to 120 mol %, and particularly preferably 80 mol % to 100 mol % based on 100 mol % of an ionic group of the dispersant.

Examples of the basic substance are the same as those in a self-dispersing polymer particle described later.

(Process of Producing Colored Particle Dispersion)

The colored particle in the invention may be obtained as a colored particle dispersion, for example, by dispersing a mixture of a pigment, a dispersant and, if necessary, a solvent (preferably organic solvent) using a dispersing machine.

The colored particle dispersion in the invention includes a pigment, a dispersant, an organic solvent which dissolves or disperses the dispersant, and a basic substance, and is preferably produced by mixing a solution containing water as a main component (mixing/hydrating step), and then removing the organic solvent (solvent removing step).

According to this process of producing the colored particle dispersion, a colored particle dispersion in which the colored particle is finely dispersed, and which is excellent in storage stability may be produced.

It is necessary that the organic solvent in the process of producing the colored particle dispersion may dissolve or disperse the dispersant in the invention, and it is preferable that the organic solvent has some extent of affinity with water in addition to this. Specifically, the organic solvent having solubility in water of 10% by mass to 50% by mass at 20° C. is preferable.

The colored particle dispersion in the invention, more particularly, may be produced by a production process including the following step (1) and step (2), being not limiting.

Step (1): a step of dispersing-treating a mixture containing a pigment, a dispersant, and an organic solvent which dissolves or disperses the dispersant, a basic substance and water, Step (2): a step of removing at least a part of the organic solvent from the mixture after dispersing-treatment.

In the step (1), first, the dispersant is dissolved or dispersed in the organic solvent to obtain a mixture of them (mixing step). Then, a solution containing a pigment and a basic substance, and containing water as a main component and, if necessary, a surfactant is added to the mixture, which is mixed, and dispersing-treated to obtain an oil-in-water type colored particle dispersion.

The addition amount (neutralization degree) of the basis substance is not particularly limited. Usually, it is preferable that a liquid nature of the finally obtained colored particle dispersion is a liquid nature near neutral, for example, the pH is 4.5 to 10. Alternatively, pH may be determined by a neutralization degree depending on the dispersant.

The pigment, the dispersant, and other additives used in the process for producing the colored particle dispersion have the same meaning as those described in a section of the colored particle, and preferable examples are also simolar.

Preferable examples of the organic solvent used in the invention include alcohol solvents, ketone solvents, and ether solvents. Among them, examples of the alcohol solvents include ethanol, isopropanol, n-butanol, tertiary butanol, isobutanol, and diacetone alcohol. Examples of the ketone solvents include acetone, methyl ethyl ketone, diethyl ketone, and methyl isobutyl ketone. Examples of the ether solvents include dibutyl ether, tetrahydrofuran, and dioxane. Among these solvents, isopropanol, acetone and methyl ethyl ketone are preferable, and methyl ethyl ketone is particularly preferable.

In addition, these organic solvents may be used alone, or a plurality of them may be used together.

In production of the colored particle dispersion, kneading and dispersing treatment may be performed using a two-roll, a three-roll, a ball mill, TROM MIL, disper, a kneader, a cokneader, a homogenizer, a blender, or a monoaxial or diaxial extruder, while a strong sharing force is imparted.

Details of kneading and dispersing are described in T. C. Patton "Paint Flow and Pigment Dispersion" (1964, published by John Wiley & Sons).

In addition, if necessary, a dispersion may be obtained by using a vertical or horizontal sand grinder, a pin mill, a slit mill, or an ultrasonic dispersing machine, and performing fine dispersing treatment with beads made of glass or zirconia having a diameter of 0.01 mm to 1 mm.

In the process of producing the colored particle dispersion in the invention, removal of the organic solvent is not particularly limited, and the organic solvent may be removed by a known method such as distillation under reduced pressure.

A colored particle in the thus obtained colored particle dispersion retains a good dispersed state, and the resulting colored particle dispersion becomes excellent in stability over time.

The colored particles used in the invention preferably have an average particle diameter of 10 nm to 200 nm, more preferably from 10 nm to 150 nm, and further preferably 10 nm to 100 nm. When the average particle diameter is 200 nm or less, color reproducibility becomes better, and in the case of an inkjet method, droplet ejection properties become better. Furthermore, when the average particle diameter is 10 nm or more, light resistance becomes better.

Particle size distribution of the colored particles is not particularly limited, and may be either of a wide particle size distribution or a monodispersed particle size distribution. A mixture of two kinds or more of water-insoluble colored particles each having monodispersed particle size distribution may be used.

The average particle diameter and the particle size distribution of the colored particles can be measured using, for example, a dynamic light scattering method.

In the water-based ink composition of the invention, colored particles of one kind may be used, or a combination of two or more kinds may be used.

From the viewpoint of image density, the content of the colored particles is preferably 0.1% by mass to 25% by mass, more preferably 1% by mass to 20% by mass, further preferably 1.5% by mass to 15% by mass, and particularly preferably 1.5% by mass to 10% by mass based on the water-based ink composition.

[Self-dispersing Polymer Particles]

The self-dispersing polymer particle in the invention contains a hydrophilic constituent unit and a hydrophobic constituent unit, and is characterized in that the hydrophobic constituent unit has at least a structure derived from alicyclic (meth)acrylate. By having the structure derived from alicyclic (meth)acrylate, a water-based ink composition good in fixability and blocking resistance of a formed image may be obtained. In addition, when the composition is applied to inkjet recording, good ejecting property is obtained.

In the invention, the self-dispersing polymer refers to a water-insoluble polymer which can attain a dispersed state in a water-based medium due to a functional group (particularly, an acidic group or a salt thereof) of the polymer itself, when the polymer is brought into the dispersed state by a phase conversion emulsifying method in the absence of a surfactant.

Herein, the dispersed state includes both of an emulsified state (emulsion) in which a water-insoluble polymer is dispersed in a water-based medium in a liquid state, and a dispersed state (suspension) in which a water-insoluble polymer is dispersed in a water-based medium in a solid state.

The self-dispersing polymer in the invention is preferably a self-dispersing polymer which may be brought into the dispersed state where the water-insoluble polymer is dispersed in a solid state, from the viewpoint of ink fixability when contained in the water-based ink composition.

Examples of a method of preparing the emulsified or dispersed state of the self-dispersing polymer, that is, an aqueous dispersion of a self-dispersing polymer, include a phase conversion emulsifying method. Examples of the phase conversion emulsifying method include, for example, a method of dissolving or dispersing a self-dispersing polymer in a solvent (e.g., water-soluble organic solvent etc.), placing this into water without adding a surfactant, stirring and mixing the materials in a state where a salt forming group (e.g., an acidic group) possessed by the self-dispersing polymer is neutralized, and removing the solvent to obtain an aqueous dispersion in the emulsified or dispersed state.

In addition, a stable emulsified or dispersed state of the self-dispersing polymer of the invention refers to a state where, even when a solution obtained by dissolving 30 g of a water-insoluble polymer in 70 g of an organic solvent (e.g., methyl ethyl ketone), a neutralizer (if a salt producing group is anionic, sodium hydroxide, and if the group is cationic, acetic acid) which may neutralize 100% of a salt forming group of the water-insoluble polymer, and 200 g of water are mixed and stirred (with a stirring device equipped with a stirring blade at a rotation speed of 200 rpm for 30 min at 25° C.), and the organic solvent is removed from the mixed solution, the emulsified or dispersed state is stably present at 25° C. for at least one week, and generation of a precipitate may not be confirmed visually.

Alternatively, stability of the emulsified or dispersed state of the self-dispersing polymer may be also confirmed by an acceleration test of settlement by centrifugation. Stability according to an acceleration test of settlement by centrifugation may be evaluated by, for example, adjusting the aqueous dispersion of polymer particles obtained by the above method to a solid matter concentration of 25% by mass, subjecting this to centrifugation at 12,000 rpm for 1 hour, and measuring a supernatant solid matter concentration after the centrifugation.

When a ratio of a solid matter concentration after centrifugation relative to a solid matter concentration before centrifugation is great (when the ratio is a numerical value near 1), this means that settlement of polymer particles due to centrifugation is not generated, or in other words that the aqueous dispersion of the polymer particles is more stable. In the invention, a ratio of the solid matter concentrations before and after centrifugation is preferably 0.80 or more, more preferably 0.90 or more, and particularly preferably 0.95 or more.

The water-insoluble polymer refers to a polymer in which when the polymer is dried at 105° C. for 2 hours, and dissolved in 100 g of water at 25° C., the amount of dissolution is 10 g or less, and the amount of dissolution is preferably 5 g or less, and further preferably 1 g or less. The amount of dissolution is the dissolution amount when 100% neutralized with sodium hydroxide or acetic acid, depending on a kind of a salt forming group of the water-insoluble polymer.

The self-dispersing polymer in the invention is such that the content of the water-soluble component exhibiting water-solubility when brought into the dispersed state is preferably 10% by mass or less, more preferably 8% by mass or less, and further preferably 6% by mass or less. By the water-soluble component being 10% by mass or less, swelling of the polymer particle, or adhering between polymer particles may be effectively suppressed, and a more stably dispersed state may be maintained. In addition, increase in the viscosity of the water-based ink composition may be suppressed, and, for example, when the water-based ink composition is applied to an inkjet method, ejection stability becomes better.

Herein, the water-soluble component refers to a compound which is contained in the self-dispersing polymer and which is dissolved in water when the self-dispersing polymer is brought into the dispersed state. The water-soluble component is a water-soluble compound which is produced as a byproduct or mixed in upon production of the self-dispersing polymer.

(Hydrophobic Constituent Unit)

The self-dispersing polymer particle in the invention contains at least one kind of a structure derived from alicyclic (meth)acrylate as the hydrophobic constituent unit.

A main chain skeleton of a polymer constituting the self-dispersing polymer particle in the invention is not particularly limited, but from the viewpoint of dispersion stability of the polymer particle, it is preferably a vinyl polymer.

-Alicyclic (meth)acrylate-

The alicyclic (meth)acrylate in the invention contains a structural site derived from (meth)acrylic acid, and a structural site derived from an alcohol, and has a structure containing at least one unsubstituted or substituted alicyclic hydrocarbon group in the structural site derived from an alcohol. The alicyclic hydrocarbon group itself may be a structural site derived from an alcohol, or may be bonded to a structural site derived from an alcohol via a linking group.

In addition, the "alicyclic (meth)acrylate" means methacrylate or acrylate having an alicyclic hydrocarbon group.

The alicyclic hydrocarbon group is not particularly limited as far as it contains a cyclic non-aromatic hydrocarbon group, and examples include a monocyclic hydrocarbon group, a dicyclic hydrocarbon group, and a tri-cyclic or higher cyclic polycyclic hydrocarbon group.

Examples of the alicyclic hydrocarbon group include cycloalkyl groups such as a cyclopentyl group and a cyclohexyl group, a cycloalkenyl group, a bicyclohexyl group, a norbornyl group, an isobornyl group, a dicyclopentanyl group, a dicyclopentenyl group, an adamantyl group, a decahydronaphthalenyl group, a perhydrofluorenyl group, a tricyclo[5.2.1.0$^{2,6}$]decanyl group, and a bicyclo[4.3.0]nonyl group.

The alicyclic hydrocarbon group may further have a substituent. Examples of the substituent include an alkyl group, an alkenyl group, an aryl group, an aralkyl group, an alkoxy group, a hydroxy group, a primary amino group, a secondary amino group, a tertiary amino group, an alkyl or arylcarbonyl group, and a cyano group.

In addition, the alicyclic hydrocarbon group may further form a fused ring.

The alicyclic hydrocarbon group in the invention is preferably such that a carbon number of an alicyclic hydrocarbon group part is 5 to 20 from the viewpoints of the viscosity and dissolution property.

Preferable examples of the linking group which connects an alicyclic hydrocarbon group and a structural site derived from an alcohol include an alkyl group, an alkenyl group, an alkylene group, an aralkyl group, an alkoxy group, a mono- or oligo-ethylene glycol group, and a mono- or oligo-propylene glycol group, each having a carbon number of 1 to 20.

Examples of the alicyclic (meth)acrylate in the invention may be shown below, but the invention is not limited to these examples.

Examples of the monocyclic (meth)acrylate include cycloalkyl (meth)acrylates in which the carbon number of a cycloalkyl group is 3 to 10, such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, and cyclodecyl (meth)acrylate.

Examples of the dicyclic (meth)acrylate include isobornyl (meth)acrylate, and norbornyl (meth)acrylate.

Examples of the tricyclic (meth)acrylate include adamantyl (meth)acrylate, dicyclopentanyl (meth)acrylate, and dicyclopentenyloxyethyl (meth)acrylate.

These may be used alone, or may be used by mixing two or more kinds.

From the viewpoints of dispersion stability, fixability, and blocking resistance of the self-dispersing polymer particle, among them, at least one of dicyclic (meth)acrylate, or tri- or higher-cyclic (meth)acrylate is preferable, and at least one selected from isobornyl (meth)acrylate, adamantyl (meth)acrylate, and dicyclopentanyl (meth)acrylate is more preferable.

In the invention, the content of the constituent unit derived from alicyclic (meth)acrylate contained in the self-dispersing polymer particle is preferably from 20% by mass to 90% by mass, more preferably from 40% by mass to 90% by mass, and particularly preferably from 50% by mass to 80% by mass, from the viewpoints of stability of the self-dispersed state, stabilization of a particle shape in a water-based medium due to hydrophobic interaction between alicyclic hydrocarbon groups, and reduction in the amount of a water-soluble component due to suitable hydrophobicization of a particle.

By the content of the constituent unit derived from alicyclic (meth)acrylate being 20% by mass or more, fixability and blocking resistance may be improved. On the other hand, by the content of the constituent unit derived from alicyclic (meth)acrylate being 90% by mass or less, stability of the polymer particle is improved.

In the invention, the self-dispersing polymer may be constructed by further comprising other constituent units, if necessary, in addition to the constituent unit derived from the alicyclic (meth)acrylate as a hydrophobic constituent unit. A monomer forming the other constituent unit is not particularly limited as far as it is a monomer which may copolymerize with the alicyclic (meth)acrylate and a hydrophilic group-containing monomer described later, and known monomers may be used.

Examples of the monomer forming the other constituent unit (hereinafter, referred to as "other copolymerizable monomer" in some cases) include alkyl (meth)acrylates such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, and ethylhexyl (meth)acrylate; aromatic ring-containing (meth)acrylates such as benzyl (meth)acrylate, and phenoxyethyl (meth)acrylate; styrenes such as styrene, α-methylstyrene, and chlorostyrene; dialkylaminoalkyl (meth)acrylates such as dimethylaminoethyl (meth)acrylate; (meth)acrylamides including N-hydroxyalkyl (meth)acrylamides such as N-hydroxymethyl(meth)acrylamide, N-hydroxyethyl(meth)acrylamide, and N-hydroxybutyl(meth)acrylamide, and N-alkoxyalkyl(meth)acrylamides such as N-methoxymethyl(meth)acrylamide, N-ethoxymethyl (meth)acrylamide, N-(n-,iso)butoxymethyl(meth)acrylamide, N-methoxyethyl(meth)acrylamide, N-ethoxyethyl (meth)acrylamide, and N-(n-,iso)butoxyethyl(meth) acrylamide.

Among them, from the viewpoints of flexibility of a polymer skeleton and easiness of glass transition temperature (Tg) control, and from the viewpoint of dispersion stability of the self-dispersing polymer, at least one kind of (meth)acrylate containing a chain alkyl group having 1 to 8 carbon atoms is preferable, and is more preferably (meth)acrylate having a chain alkyl group having 1 to 4 carbon atoms, and particularly preferably methyl (meth)acrylate or ethyl (meth)acrylate. Herein, the chain alkyl group refers to an alkyl group having a straight chain or a branched chain.

In addition, in the invention, (meth)acrylate containing an aromatic group may be also preferably used.

When aromatic-containing (meth)acrylate is contained as other copolymerizable monomer, from the viewpoint of dispersion stability of the self-dispersing polymer particle, the content of the constituent unit derived from aromatic-containing (meth)acrylate is preferably 40% by weight or less, more preferably 30% by weight or less, and particularly preferably 20% by weight or less.

In addition, when a styrene-based monomer is used as the other copolymerizable monomer, from the viewpoint of stability when formulated into a self-dispersing polymer particle, the content of the constituent unit derived from the styrene-based monomer is preferably 20% by mass or less, more preferably 10% by mass or less, further preferably 5% by mass or less, and an embodiment containing no constituent unit derived from the styrene-based monomer is particularly preferable.

Herein, the styrene-based monomer refers to styrene, substituted styrene (α-methylstyrene, chlorostyrene etc.), and styrene macromer having a polystyrene structural unit.

In the invention, the other copolymerizable monomer may be used alone, or may be used by combining two or more kinds.

When the self-dispersing polymer particle contains the other constituent unit, the content thereof is preferably 10% by mass to 80% by mass, more preferably 15% by mass to 75% by mass, and particularly preferably 20% by mass to 70% by mass. When two or more kinds of monomers forming the other constituent unit are used in combination, the total amount is preferably in the aforementioned range.

(Hydrophilic Constituent Unit)

The self-dispersing polymer contains at least one hydrophilic structural unit. There is no limitation on the hydrophilic structural unit as long as it is derived from a hydrophilic group-containing monomer. The hydrophilic structural unit may be either a unit derived from one hydrophilic group-containing monomer or a unit derived from two or more hydrophilic group-containing monomers. The hydrophilic group is not particularly limited, and may be a dissociative group or a nonionic hydrophilic group.

From the viewpoints of promoting self-dispersing property and improving the stability of the formed emulsified state or dispersed state, it is preferable that at least one of the hydrophilic groups is a dissociative group, and it is more preferable that at least one of the hydrophilic groups is an anionic dissociative group. Examples of the anionic dissociative group include a carboxy group, a phosphoric acid group, and a sulfonic acid group. Among the above, from the viewpoint of fixability at the time when a water-based ink composition is formed of the self-dispersing polymer, a carboxy group is particularly preferable as the anionic dissociative group.

From the viewpoint of self-dispersibility, the hydrophilic group-containing monomer in the invention is preferably a dissociative group-containing monomer, and more preferably a dissociative group-containing monomer having a dissociative group and an ethylenically unsaturated bond.

Examples of the dissociative group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methylsuccinate. Specific examples of the unsaturated sulfonic acid monomer include styrene sulfonic acid, 2-acrylamido-2-methyl propane sulfonic acid, 3-sulfopropyl (meth)acrylate, and bis-(3-sulfopropyl)-itaconate. Specific examples of the unsaturated phosphoric acid monomer include vinyl phosphonic acid, vinyl phosphate, bis(methacryloxyethyl) phosphate, diphenyl-2-acryloyloxy ethyl phosphate, diphenyl-2-methacryloyloxy ethyl phosphate, and dibutyl-2-acryloyloxy ethyl phosphate.

Among the above dissociative group-containing monomers, the unsaturated carboxylic acid monomer is preferable, and acrylic acid and methacrylic acid are more preferable from the viewpoint of dispersion stability and the ejection stability.

In addition, examples of the monomer having a nonionic hydrophilic group include ethylenically unsaturated monomers containing a (poly)ethylene oxy group or a propyleneoxy group such as 2-methoxyethyl acrylate, 2-(2-methoxyethoxy)ethyl acrylate, 2-(2-methoxyethoxy)ethyl methacrylate, ethoxytriethylene glycol methacrylate, methoxypolyethylene glycol (having a molecular weight of 200 to 1000) monomethacrylate, and polyethylene glycol (having a molecular weight of 200 to 1000) monomethacrylate, and ethylenically unsaturated monomers having a hydroxy group such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate, and hydroxyhexyl (meth)acrylate.

In addition, as the monomer having the nonionic hydrophilic group, an ethylenically unsaturated monomer having a terminus of alkyl ether is more preferable than an ethylenically unsaturated monomer having a terminus of a hydroxy group, from the viewpoints of stability of a particle, and the content of a water-soluble component.

The hydrophilic constituent unit in the invention is preferably either of an embodiment containing only a hydrophilic unit having an anionic dissociative group, or an embodiment containing both of the hydrophilic constituent unit having an anionic dissociative group, and the hydrophilic constituent unit having a nonionic hydrophilic group.

Alternatively, an embodiment containing two or more kinds of hydrophilic units having the anionic dissociative group, and an embodiment using two or more kinds of the hydrophilic constituent unit having an anionic dissociative group, and the hydrophilic constituent unit having a nonionic hydrophilic group are also preferable.

The content of the hydrophilic constituent unit in the self-dispersing polymer, from the viewpoints of the viscosity and stability over time, is preferably 25% by mass or less, more preferably 1% by mass to 25% by mass, further preferably 2% by mass to 23% by mass, and particularly preferably 4% by mass to 20% by mass.

In addition, when the polymer has two or more kinds of hydrophilic constituent units, it is preferable that the total content of the hydrophilic constituent units is in the above range.

The content of the constituent unit having the anionic dissociative group in the self-dispersing polymer is preferably in such the range that the acid value is in a suitable range described later.

In addition, the content of the constituent unit having the nonionic hydrophilic group, from the viewpoints of ejection stability and stability over time, is preferably 0% by mass to 25% by mass, more preferably 0% by mass to 20% by mass, and particularly preferably 0% by mass to 15% by mass.

In the case of the self-dispersing polymer having an anionic dissociative group, the acid value (KOHmg/g) of the self-dispersing polymer of the invention is preferably from 20 to 200, more preferably from 22 to 120, still more preferably from 25 to 100, and particularly preferably from 30 to 80 from the viewpoint of self dispersibility, the content of water-soluble component, and fixability at the time when a water-based ink composition is formed. When the acid value is 20 or more, the particles can be more stably dispersed. When the acid value is 200 or less, the water soluble component can be reduced.

The self-dispersing polymer in the invention, from the viewpoint of dispersion stability, is preferably a polymer obtained by polymerizing at least three kinds of aliphatic (meth)acrylate, other copolymerizable monomer, and the hydrophilic group-containing monomer, and more preferably a polymer obtained by polymerizing at least three kinds of aliphatic (meth)acrylate, an alkyl group-containing (meth)acrylate having a straight or branched chain having 1 to 8 carbon atoms, and the hydrophilic group-containing monomer.

In the invention, from the viewpoint of dispersion stability, the content of the constituent unit having a substituent of great hydrophobicity derived from (meth)acrylate having a straight chain or branched alkyl group having 9 or more carbon atoms, and an aromatic group-containing macromonomer is preferably such that the constituent unit is not substantially contained, more preferably such that the constituent unit is not entirely contained.

The self-dispersing polymer in the invention may be a random copolymer in which each constituent unit is irregularly introduced, or a block copolymer in which each constituent unit is regularly introduced, and each constituent unit in the case of the block copolymer may be a unit synthesized in any introduction order, and the same constituent component may be used two or more times, and a random copolymer is preferable from the viewpoints of general use and productivity.

The range of the molecular weight of the self-dispersing polymer in the invention is preferably from 3,000 to 200,000, more preferably from 10,000 to 200,000, and still more preferably from 30,000 to 150,000 in terms of weight average molecular weight. When the weight average molecular weight is adjusted to 3,000 or more, the amount of water soluble component can be effectively reduced. Moreover, when the weight average molecular weight is adjusted to 200,000 or less, the self-dispersion stability can be increased.

The weight average molecular weight can be measured by gel permeation chromatography (GPC).

In addition, the glass transition temperature (Tg) of the self-dispersing polymer in the invention is preferably 40° C. to 180° C., more preferably 60° C. to 170° C., and particularly preferably 70° C. to 150° C. By the glass transition temperature being 40° C. or higher, scratch resistance and blocking resistance of a printed matter obtained by printing using the water-based ink composition becomes better. On the other hand, when the glass transition temperature is 180° C. or lower, scratch resistance becomes better.

The self-dispersing polymer of the invention, from the viewpoint of hydrophilic hydrophobic property control of the polymer, is a vinyl polymer containing a structure derived from alicyclic (meth)acrylate at a copolymerization ratio of 20% by mass to 90% by mass, and at least one of, a structure derived from the dissociative group-containing monomer and a structure derived from (meth)acrylate containing a chain alkyl group having 1 to 8 carbon atoms, and having the acid value of 20 to 120, the total content of the hydrophilic structural units of 25% by mass or less, and the weight average molecular weight of 3000 to 200000.

In addition, the self-dispersing polymer is more preferably a vinyl polymer containing a structure derived from dicyclic or tri- or higher cyclic (meth)acrylate at a copolymerization ratio of 30% by mass to 90% by mass, a structure derived from (meth)acrylate containing a chain alkyl group having 1 to 4 carbon atoms at a copolymerization ratio of 10% by mass to 80% by mass, and a structure derived from a carboxy group-containing monomer in a range of the acid value is 25 to 100, and having the total content of the hydrophilic structural units of 25% by mass or less, and the weight average molecular weight of 10000 to 200000.

Further, the self-dispersing polymer is particularly preferably a vinyl polymer containing a structure derived from dicyclic or tri- or higher cyclic (meth)acrylate at a copolymerization ratio of 40% by mass to 80% by mass, a structure derived from at least methyl (meth)acrylate or ethyl (meth)acrylate at a copolymerization ratio of 20% by mass to 70% by mass, and a structure derived from acrylic acid or methacrylic acid in a range such that the acid value is 30 to 80, having the total content of the hydrophilic structural units of 25% by mass or less, and the weight average molecular weight of 30000 to 150000.

Specific examples of the self-dispersing polymer (Compounds B-01 to B-13) are shown below, but the invention is not limited thereto. The ratio in the parentheses indicates the mass ratio of copolymerization components.

B-01: Methyl methacrylate/isobornyl methacrylate/methacrylic acid copolymer (20/72/8)

B-02: Methyl methacrylate/isobornyl methacrylate/benzyl methacrylate/methacrylic acid copolymer (30/50/14/6)

B-03: Methyl methacrylate/dicyclopentanyl methacrylate/methacrylic acid copolymer (40/50/10)

B-04: Methyl methacrylate/dicyclopentanyl methacrylate/phenoxyethyl methacrylate/methacrylic acid copolymer (30/50/14/6)

B-05: Methyl methacrylate/isobornyl methacrylate/methoxypolyethylene glycol methacrylate (n=2)/methacrylic acid copolymer (30/54/10/6)

B-06: Methyl methacrylate/dicyclopentanyl methacrylate/methoxypolyethylene glycol methacrylate (n=2)/methacrylic acid copolymer (54/35/5/6)

B-07: Methyl methacrylate/adamantyl methacrylate/methoxypolyethylene glycol methacrylate (n=23)/methacrylic acid copolymer (30/50/15/5)

B-08: Methyl methacrylate/isobornyl methacrylate/dicyclopentanyl methacrylate/methacrylic acid copolymer (20/50/22/8)

B-09: Ethyl methacrylate/cyclohexyl methacrylate/acrylic acid copolymer (50/45/5)

B-10: Isobutyl methacrylate/cyclohexyl methacrylate/acrylic acid copolymer (40/50/10)

B-11: n-Butyl methacrylate/cyclohexyl methacrylate/styrene/acrylic acid copolymer (30/55/10/5)

B-12: Methyl methacrylate/dicyclopentenyloxyethyl methacrylate/methacrylic acid copolymer (40/52/8)

B-13: Lauryl methacrylate/dicyclopentenyloxyethyl methacrylate/methacrylic acid copolymer (25/65/10)

The process of producing the self-dispersing polymer in the invention is not particularly limited, but the polymer may be produced by copolymerizing a monomer mixture by the known polymerization methods. Among these polymerization methods, from the viewpoint of droplet ejection stability when formulated into a water-based ink composition, polymerization in an organic medium is more preferable, and a solution polymerization method is particularly preferable.

In the process of producing the self-dispersing polymer of the invention, a mixture containing a monomer mixture and, if necessary, an organic solvent and a radical polymerization initiator is allow to react to perform coplymerization under an inert gas atmosphere to produce the water-insoluble polymer.

The process for producing an aqueous dispersion of the self-dispersing polymer particles in the invention is not particularly limited, and the aqueous dispersion of the self-dispersing polymer particles may be obtained by a known method. A step of obtaining the self-dispersing polymer as an aqueous dispersion is preferably a phase conversion emulsification method including the following step (1) and step (2).

Step (1): a step of stirring a mixture containing a water-insoluble polymer, an organic solvent, a neutralizer and a water-based medium to obtain a dispersion.

Step (2): a step of removing at least a part of the organic solvent from the dispersion. The step (1) is preferably a treatment to firstly dissolve the water-insoluble polymer in an organic solvent, secondly gradually add a neutralizer and a water-based medium to the resultant, and then mixing and stirring the resultant to obtain a dispersion. By thus adding a neutralizer and a water-based medium to the water-insoluble polymer solution which has been dissolved into an organic solvent, self-dispersing polymer particles having a particle diameter to achieve a higher storage stability can be obtained without requiring strong shearing force.

There is no particular limitation on a method to stir the mixture, and examples thereof include a method using a generally-used mixing-stirring device and a method using a disperser such as an ultrasonic disperser or a high pressure homogenizer, as required.

Preferable examples of the organic solvent include an alcohol solvent, a ketone solvent, and an ether solvent.

Examples of the alcohol solvent include isopropanol, n-butanol, t-butanol, and ethanol. Examples of the ketone solvent include acetone, methyl ethyl ketone, diethyl ketone, and methyl isobutyl ketone. Examples of the ether solvent include dibutyl ether and dioxane. Among the above solvents, a ketone solvent such as methyl ethyl ketone, and an alcohol solvent such as isopropanol are preferable. It is also preferable to use isopropanol and methyl ethyl ketone in combination. By using the solvents in combination, self-dispersing polymer particles with a fine particle diameter, high dispersion stability, and freeness from coagulation-precipitation and fusion of particles can be obtained because of, for example, moderating the polarity change at the time of the phase inversion from an oil phase to an aqueous phase.

The neutralizer can be used in order to form a stable emulsified or dispersed state in which a dissociative group is partially or completely neutralized to have the self-dispersing polymer be stable in water. Examples of the neutralizer to be used when the self-dispersing polymer of the invention has an anionic dissociative group include basic compounds, such as hydroxides of an organic amine compound, ammonia, or alkali metal. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, and tri-isopropanolamine. Examples of the hydroxides of alkali metal include lithium hydroxide, sodium hydroxide, and potassium hydroxide. Particularly, from the viewpoint of dispersion stability in water of the self-dispersing polymer particles of the invention, sodium hydroxide, potassium hydroxide, triethylamine, and triethanolamine are preferable.

These basic compounds are used at preferably 5 mol % to 120 mol %, more preferably 20 mol % to 100 mol %, and further preferably 30 mol % to 80 mol % based on 100 mol % of the dissociative group. By adopting 15 mol % or more, the effect of stabilizing the dispersion of the particles in water appears and, by adopting 80 mol % or less, there is the effect of reducing a water-soluble component.

In the step (2), an organic solvent is distilled off from the dispersion obtained in the step (1) by a conventional method such as distillation under reduced pressure to convert a phase into an aqueous system, thereby, an aqueous dispersion of the self-dispersing polymer particles may be obtained. The organic solvent in the resulting aqueous dispersion has been substantially removed, and the amount of the organic solvent is preferably 0.2% by mass or less, and more preferably 0.1% by mass or less.

The average particle diameter of the self-dispersing polymer particles is preferably within the range of from 1 nm to 100 nm, more preferably from 3 nm to 80 nm, and still more preferably from 5 nm to 60 nm. Particularly preferable is from 5 nm to 40 nm. When the average particle diameter is 1 nm or more, the production suitability of the particles can be improved. When the average particle diameter is adjusted to 100 nm or less, the storage stability of the particles can be improved.

There is no particular limitation on the particle size distribution of the self-dispersing polymer particles. The self-dispersing polymer particles may have a wide particle size distribution or a monodispersed particle size distribution. Two or more kinds of water-insoluble particles may be used in combination.

The average particle diameter and the particle size distribution of the self-dispersing polymer particles can be measured using light scattering or the like.

In addition, in the water-based ink composition of the invention, it is preferable that the self-dispersing polymer particle is present in a form containing substantially no coloring material.

The self-dispersing polymer particle of the invention is excellent in self-dispersibility, and stability when it is dispersed as a polymer alone is very high. However, for example, since the function as a so-called dispersant which stably disperses the pigment is not high, when the self-dispersing polymer in the invention is present in the water-based ink composition in a form containing the pigment, stability of the water-based ink composition as a whole is consequently reduced greatly in some cases.

The water-based ink composition of the invention may contain self-dispersing polymer particles, of one kind, or two or more kinds of particles.

In addition, the content of the self-dispersing polymer particles in the water-based ink composition of the invention, from the viewpoint of the glossiness of an image, is preferably 1% by mass to 30% by mass, more preferably 2% by mass to 20% by mass, and particularly preferably 2% by mass to 10% by mass based on the water-based ink composition.

In addition, the content ratio of the colored particles and the self-dispersing polymer particles (colored particles/self-dispersing polymer particles) in the water-based ink composition in the invention, from the viewpoint of scratch resistance of an image, is preferably 1/0.5 to 1/10, and more preferably 1/1 to 1/4.

(Water-soluble Solvent)

The water-based ink composition of the invention contains a water-based medium. The water-based medium contains at least water as a solvent, and preferably contains water and a water-soluble solvent. The water-soluble solvent is used for the purpose of a drying preventing agent, a wetting agent or a permeation accelerator.

For the purpose of preventing clogging due to drying of the inkjet ink at an ink ejection port of a nozzle, a drying preventing agent and a wetting agent are used and, as the drying preventing agent and the wetting agent, a water-soluble organic solvent having a lower vapor pressure than that of water is preferable.

In addition, for the purpose of permeating the water-based ink composition (particularly, ink composition for inkjet) into a paper better, the water-soluble organic solvent is suitably used as a permeation accelerator.

The drying preventing agent and the wetting agent used in the invention are not particularly limited, and known drying preventing agents and wetting agents may be used. In the invention, it is preferable that the water-soluble solvent, from the viewpoint of suppression of occurrence of curl in a recording medium, contains a water-soluble solvent having the SP value of 27.5 or less at 90% by mass or more based on the entire water-soluble solvent, and at least one kind of a compound represented by the structural formula (1) described below.

The "water-soluble solvent having the SP value of 27.5 or less" and the "compound represented by structural formula (1)" may be the same or different.

The solubility parameter (SP value) of a water-soluble solvent as used in the invention is a value expressed by the square root of cohesive energy of molecules. SP values can be calculated by the method described in R. F. Fedors, Polymer Engineering Science, 14, pp. 147 to 154 (1974). The values used in this invention are preferably calculated by this method. Specifically, in the method described in the above scientific article by R. F. Fedors, the solubility parameter (SP value) of a particular water-soluble solvent at 25° C. can be calculated using the following equation:

$$\delta = \left[ \frac{\sum_i \Delta e_i}{\sum_i \Delta v_i} \right]^{1/2}$$

In the above equation $\delta$ represents the solubility parameter (SP value) of the water-soluble solvent at 25° C.; $\Delta e_i$ is the additive atomic and group contribution for the energy of vaporization of said solvent; $\Delta v_i$ is the additive atomic and group contribution for the molar volume of said solvent; and the summation index i represents the number of atoms or groups within the molecular structure of the water-soluble solvent. The contributions $\Delta e_i$ and $\Delta v_i$ at a temperature of 25° C. are listed in Table 5 on page 152 of Fedor's article as identified above. Hence, based on only the knowledge of the chemical structure of the particular water-soluble solvent, i.e. the atoms and groups constituting the molecular structure thereof, the required contributions $\Delta e_i$ and $\Delta v_i$ can be selected from Table 5 of Fedor's paper, and on their basis $\delta$ be calculated using the above equation. In the event that the water-soluble solvent has a cyclic structure, the solubility parameter thereof can be estimated from the properties of a linear compound having the same chemical structure, and adding a cyclization increments $\Delta e_i$ and $\Delta v_i$, which increment is also listed in Table 5 of the paper. More details and a concrete example for calculating the solubility parameter of a cyclic water-soluble solvent are provided on pages 152 and 153 of Fedor's paper. As will be appreciated from the above, according to a preferred embodiment, the SP value of the water-soluble solvent for use in the present invention refers to a temperature of 25° C.

Structural Formula (1)

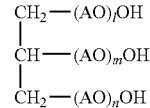

In the structural formula (1), l, m and n are each independently an integer of 1 or more, and represents l+m+n=3 to 15, and l+m+n of 3 to 12 is preferable, and more preferably 3 to 10.

By adopting l+m+n of 3 or more, a good curl suppressing force may be exhibited. Further, by adopting l+m+n of 15 or less, good ejection property is obtained.

In structural formula (1), AO represents ethyleneoxy (EO) and/or propyleneoxy (PO) and, inter alia, a propyleneoxy group is preferable. In addition, each AO in the $(AO)_l$, $(AO)_m$ and $(AO)_n$ may be each the same or different.

Examples of the water-soluble solvent having the SP value of 27.5 or less and the compound represented by structural formula (1) will be shown below together with the SP value (in parenthesis). However, the invention is not limited to them.

Diethylene glycol monoethyl ether (SP value 22.4)
Diethylene glycol monobutyl ether (SP value 21.5)
Triethylene glycol monobutyl ether (SP value 21.1)
Dipropylene glycol monomethyl ether (SP value 21.3)
Dipropylene glycol (SP value 27.2)
POP (3) glyceryl ether (SP value 26.4)

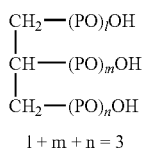

POP (4) glyceryl ether (SP value 24.9)

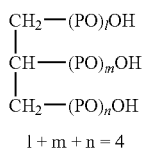

POP (5) glyceryl ether (SP value 23.9)

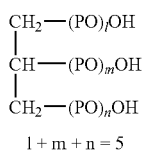

POP (6) glyceryl ether (SP value 23.2)

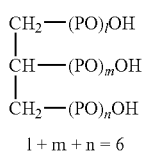

POP (7) glyceryl ether (SP value 22.6)

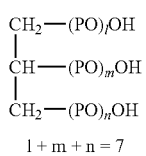

$nC_4H_9O(AO)_4$—H (AO=EO or PO, ratio EO:PO=1:1) (SP value 20.1)
$nC_4H_9O(AO)_{10}$—H (AO=EO or PO, ratio EO:PO=1:1) (SP value 18.8)
$HO(A'O)_{40}$—H (A'O=EO or PO, ratio EO:PO=1:3) (SP value 18.7)
$HO(A''O)_{55}$—H (A''O=EO or PO, ratio EO:PO=5:6) (SP value 18.8)
$HO(PO)_3$—H (SP value 24.7)
$HO(PO)_7$—H (SP value 21.2)
1,2-Hexanediol (SP value 27.4)

In the invention, EO and PO each represent an ethyleneoxy group and a propyleneoxy group, respectively.

A ratio of the compound of the structural formula (1) occupied in the entire water-soluble solvent (content) is preferably 10% or more, more preferably 30% or more, and further preferably 50% or more. By adopting the range, curl may be suppressed without deteriorating stability and ejection property of the ink, being preferable.

In addition, in the invention, other solvents may be used together in such the range that a ratio of the water-soluble solvent having the SP value of 27.5 or less relative to the entire water-soluble solvent is not less than 90%.

Examples of the water-soluble organic solvent which may be used together include alkanediol (polyhydric alcohols) such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, and 4-methyl-1,2-pentanediol; saccharides such as glucose, mannose, fructose, ribose, xylose, arabinose, galactose, aldonic acid, glucitol, maltose, cellobiose, lactose, sucrose, trehalose, and maltotriose; sugar alcohols; hyaluronic acids; so-called solid wetting agents such as ureas; alkyl alcohols having 1 to 4 carbon atoms such as ethanol, methanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; 2-pyrrolidone, N-methyl-2-pyrrolidone, 1,3-dimethyl-2-imidazolidinone, formamide, acetamide, dimethyl sulfoxide, sorbit, sorbitan, acetine, diacetine, triacetine, and sulfolane. One kind or two or more kinds of them may be used.

For the purpose of the drying preventing agent and the wetting agent, polyhydric alcohols are used, and examples include glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, and 1,2,6-hexanetriol. These may be used alone, or two or more kinds may be used together.

For the purpose of the penetrating agent, a polyol compound is preferable, and examples of the aliphatic diol include 2-ethyl-2-methyl-1,3-propanediol, 3,3-dimethyl-1,2-butanediol, 2,2-diethyl-1,3-butanediol, 2-methyl-2-propyl-1,3-propanediol, 2,4-dimethyl-2,4-pentanediol, 2,5-dimethyl-2,5-hexanediol, 5-hexene-1,2-diol, and 2-ethyl-1,3- hexanediol. Among them, preferable examples include 2-ethyl-1,3-hexanediol and 2,2,4-triemethyl-1,3-pentanediol.

The water-soluble solvent used in the invention may be used alone, or may be used by mixing two or more kinds.

The content of the water-soluble solvent in the entire ink composition, from the viewpoints of maintenance of stability and ejection reliability, is preferably 1% by mass to 60% by mass, 5% by mass to 40% by mass, and particularly preferably 10% by mass to 30% by mass.

The addition amount of water used in the invention is not particularly limited, but from the viewpoints of maintenance of stability and ejection reliability, the amount is preferably 10% by mass to 99% by mass, more preferably 30% by mass to 80% by mass, and further preferably 50% by mass to 70% by mass in the water-based ink composition.

(Other Additives)

Examples of other additives which can be used in the invention include known additives such as a color fading inhibitor, emulsion stabilizer, permeation accelerator, ultraviolet absorber, preservative, mildew-proofing agent, pH regulator, surface tension regulator, defoamer, viscosity regulator, dispersant, dispersion stabilizer, anti-rust agent and chelating agent. These various additives may directly be added after preparation of the water-based ink composition, or may be added at the time of preparation of the water-based ink composition.

The ultraviolet absorber is used for the purpose of improving storability of an image. The ultraviolet absorber can use benzotriazole compounds described in, for example, JP-A Nos. 58-185677, 61-190537, 2-782, 5-197075 and 9-34057; benzophenone compounds described in, for example, JP-A Nos. 46-2784 and 5-194483, and U.S. Pat. No. 3,214,463; cinnamic acid compounds described in, for example, Japanese Patent Application Publication (JP-B) Nos. 48-30492 and 56-21141, and JP-A No. 10-88106; triazine compounds described in, for example, JP-A Nos. 4-298503, 8-53427, 8-239368 and 10-182621, and Japanese National Phase Publication (JP-W) No. 8-501291; compounds described in Research Disclosure No. 24239; and compounds that absorb ultraviolet light and emit fluorescence, i.e., fluorescent brighteners, represented by stilbene compounds or benzoxazole compounds.

The color fading inhibitor is used for the purpose of improving storability of an image. Examples of the color fading inhibitor that can be used include various organic color fading inhibitors and metal complex color fading inhibitors. Examples of the organic color fading inhibitor include hydroquinones, alkoxyphenols, dialkoxyphenols, phenols, anilines, amines, indanes, chromanes, alkoxyanilines and heterocycles. Examples of the metal complex color fading inhibitor include a nickel complex and a zinc complex. More specifically, compounds described in the patents cited in Research Disclosure No. 17643, chapter VII, items I to J; Research Disclosure No. 15162: Research Disclosure No. 18716, page 650, the left-hand column; Research Disclosure No. 36544, page 527; Research Disclosure No. 307105, page 872; and Research Disclosure No. 15162, and compounds included in the formulae of the representative compounds and the exemplified compounds described on pages 127 to 137 of JP-A No. 62-215272 can be used.

Examples of the mildew-proofing agent include sodium dehydroacetate, sodium benzoate, sodium pyridinethiol-1-oxide, ethyl p-hydroxybenzoate, 1,2-benzisothiazolin-3-one and a salt thereof. These are preferably used in the water-based ink composition in an amount of from 0.02 mass % to 1.00 mass %.

As the pH regulator, a neutralizer (organic base and inorganic alkali) may be used. The pH regulator may be added in an amount such that the water-based ink composition has pH of preferably from 6 to 10, and more preferably from 7 to 10, for the purpose of improving storage stability of the water-based ink composition.

Examples of the surface tension regulator include nonionic surfactants, cationic surfactants, anionic surfactants and betaine surfactants.

The surface tension regulator is added in an amount such that the surface tension of the water-based ink composition is adjusted to preferably from 20 mN/m to 60 mN/m, more preferably from 20 mN/m to 45 mN/m, and further preferably from 25 mN/m to 40 mN/m, in order to well eject the water-based ink composition by an inkjet method. On the other hand, when an ink is applied by a method other than an inkjet method, the surface tension is preferably in a range of from 20 mN/m to 60 mN/m, and more preferably in a range of from 30 mN/m to 50 mN/m.

The surface tension of the water-based ink composition can be measured using, for example, a plate method.

Specific examples of the surfactant as a hydrocarbon type preferably include anionic surfactants such as fatty acid salts, alkyl sulfate ester salts, alkyl benzene sulfonates, alkyl naphthalene sulfonates, dialkyl sulfosuccinates, alkyl phosphate ester salts, naphthalenesulfonic acid-formalin condensates and polyoxyethylene alkyl sulfate ester salts; and nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkyl amine, glycerin fatty acid ester and oxyethylene oxypropylene block copolymer. SURFYNOLS (trade name, products of Air Products & Chemicals) which are an acetylene type polyoxyethylene oxide surfactant are preferably used. Furthermore, amine oxide type amphoteric surfactants such as N,N-dimethyl-N-alkylamine oxide are preferred.

Additionally, materials described on pages (37) to (38) of JP-A No. 59-157636 and Research Disclosure No. 308119 (1989) as surfactants can be used.

When fluorocarbon (alkyl fluoride type) surfactants, silicone surfactants and the like, such as those described in JP-A Nos. 2003-322926, 2004-325707 and 2004-309806 are used, scratch resistance can be improved.

The surface tension regulator can be used as a defoamer, and fluorine compounds, silicone compounds, chelating agents represented by EDTA, and the like can be used.

When the ink is applied by an inkjet method, the water-based ink composition of the invention has a viscosity preferably in a range of from 1 mPa·s to 30 mPa·s, more preferably in a range of from 1 mPa·s to 20 mPa·s, further preferably in a range of from 2 mPa·s to 15 mPa·s, and particularly preferably in a range of from 2 mPa·s to 10 mPa·s, from the standpoints of droplet ejection stability and aggregation speed.

When the ink is applied by a method other than an inkjet method, the viscosity is preferably in a range of from 1 mPa·s to 40 mPa·s, and more preferably in a range of from 5 mPa·s to 20 mPa·s.

The viscosity of the water-based ink composition can be measured using, for example, a Brookfield viscometer.

Ink Set

An ink set of the invention contains at least one kind of the water-based ink composition.

The ink set of the invention can be used for a recording method using the water-based ink composition, and is preferable as an ink set specifically used for an inkjet recording method to be described later. Moreover, the ink set of the invention is preferable, for example, in that it can be used in the form of an ink cartridge which houses the ink set integrally or independently and the handling thereof can be convenient. An ink cartridge containing an ink set is known in this technical field, and the ink set of the invention can be used as an ink cartridge suitably using known methods.

In addition, the ink set of the invention may contain a treating liquid composition for improving printability in at least one kind of the recording liquid.

(Treating Liquid Composition for Improving Printability)

In the invention, prior to impartation of the water-based ink composition, a treating liquid composition for improving printability may be imparted on a recording medium.

The treating liquid in the invention is an aqueous composition which may form an aggregate when it is contacted with the water-based ink composition, specifically, the treating liquid contains at least an aggregation component which may aggregate a dispersed particles such as colored particles (pigment etc.) in the ink composition to form an aggregate when it is mixed with the ink composition and, if necessary, it may be constructed using other components. By using the treating liquid with the ink composition, inkjet recording may be speeded up and, even when high speed recording is performed, an image high in the density and resolution is obtained.

(Aggregation Component)

The treating liquid contains at least one kind of an aggregation component which may form an aggregate when it is contacted with the ink composition. For example, by mixing the treating liquid with the ink composition ejected by the inkjet method, aggregation of the pigment and the like which are stably dispersed in the ink composition is promoted.

Examples of the treating liquid include a liquid which may generate an aggregate by changing the pH of the ink composition. Thereupon, the pH ($25°$ C.$±1°$ C. of the treating liquid), from the viewpoint of an aggregating rate of the ink composition, is preferably 1 to 6, more preferably 1.2 to 5, and further preferably 1.5 to 4. In this case, the pH ($25°$ C.$±1°$ C.) of the ink composition used in an ejection step is preferably 7.5 to 9.5 (more preferably, 8.0 to 9.0).

Inter alia, in the invention, from the viewpoints of an image density, resolution, and speed-up of inkjet recording, the case where the pH ($25°$ C.) of the ink composition is 7.5 or higher, and the pH ($25°$ C.) of the treating liquid is 3 to 5 is preferable.

The aggregation component may be used alone, or may be used by mixing two or more kinds.

The treating liquid may be constructed using at least one kind of acidic compound as the aggregation component. As the acidic compound, a compound having a phosphoric acid group, a phosphonic acid group, a phosphinic acid group, a sulfuric acid group, a sulfonic acid group, a sulfinic acid group, or a carboxy group, or a salt thereof (e.g. polyvalent metal salt) may be used. Inter alia, from the viewpoint of an aggregation rate of the ink composition, a compound having a phosphoric acid group or a carboxy group is more preferable, and a compound having a carboxy group is further preferable.

The compound having a carboxy group is preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumaric acid, thiophenecarboxylic acid, nicotinic acid, or derivatives thereof, and a salt thereof (e.g. polyvalent metal salt). These compounds may be used alone, or two or more kinds may be used together.

The treating liquid in the invention may be constructed to contain further an aqueous solvent (e.g. water) in addition to the acidic compound.

The content of the acidic compound in the treating liquid, from the viewpoint of aggregation effect, is preferably 5% by mass to 95% by mass, more preferably 10% by mass to 80% by mass based on the total mass of the treating liquid.

In addition, a preferable example of the treating liquid for improving high speed aggregation property includes a treating liquid to which a polyvalent metal salt or polyallylamine is added. Examples of the polyvalent metal salt include salts of alkaline earth metals belonging to Group 2 of Periodic Table (e.g. magnesium, calcium), transition metals belonging to Group 3 of Periodic Table (e.g. lanthanum), cations from Group 13 of Periodic Table (e.g. aluminum), or lanthanides (e.g. neodymium), polyallylamine, and a polyallylamine derivative. As the metal salt, a carboxylic acid salt (a formic acid salt, an acetic acid salt, a benzoic acid salt etc.), a nitric acid salt, chloride, and a thiocyanic acid salt are preferable. Inter alia, preferable are a calcium salt or a magnesium salt of carboxylic acid (formic acid, acetic acid, benzoic acid etc.), a calcium salt or a magnesium salt of nitric acid, calcium chloride, magnesium chloride, and a calcium salt or a magnesium salt of thiocyanic acid.

The content of the metal salt in the treating liquid is preferably in a range of 1% by mass to 10% by mass, more preferably 1.5% by mass to 7% by mass, and further preferably 2% by mass to 6% by mass.

The viscosity of the treating liquid, from the viewpoint of an aggregation rate of the ink composition, is preferably in a range of 1 mPa·s to 30 mPa·s, more preferably in a range of 1 mPa·s to 20 mPa·s, further preferably in a range of 2 mPa·s to 15 mPa·s, particularly preferably in a range of 2 mPa·s to 10 mPa·s. The viscosity is measured under the condition of $20°$ C. using VISCOMETER TV-22 (trade name, manufactured by TOKI SANGYO CO. LTD.).

The surface tension of the treating liquid, from the viewpoint of an aggregation rate of the ink composition, is preferably 20 mN/m to 60 mN/m, more preferably 20 mN/m to 45 mN/m, and further preferably 25 mN/m to 40 mN/m. The surface tension is measured under the condition of $25°$ C. using Automatic Surface Tensiometer (trade name: CBVP-Z, manufactured by Kyowa Interface Science Co., Ltd.).

<Image Forming Method>

The image forming method of the invention includes an ink imparting step of using the water-based ink composition or the ink set of the invention to impart the water-based ink composition to a recording medium. The water-based ink composition and the ink set of the invention may be used for general writing material, recorders, or pen plotter, and is particularly preferably used for the inkjet recording method. The inkjet recording method which may use the ink set or the ink cartage of the invention includes any recording method which ejects the ink composition as liquid droplets through a fine nozzle, and makes the liquid droplets adhere to a recording medium. The recording medium in the invention is not particularly limited, but examples include a plain paper, a wood free paper, and a coated paper.

Examples of the preferable inkjet recording method in the invention include a method of giving the energy to the water-based ink composition to form an image on the known recording medium, that is, a plain paper, a resin-coated paper, for example, inkjet exclusive-use paper, a film, an electrography common use paper, fabric, glass, metal and porcelain described in JP-A Nos. 8-169172, 8-27693, 2-276670, 7-276789, 9-323475, 62-238783, 10-153989, 10-217473, 10-235995, 10-337947, 10-217597, and 10-337947. As a preferable inkjet recording method in the invention, the description of paragraph numbers 0093 to 0105 of JP-A No.2003-306623 maybe applied.

In the invention, upon formation of an image, a polymer latex compound may be used together for the purpose of imparting glossiness and water resistance, and improving weather resistance. The latex compound may be imparted to an image receiving material before, after or simultaneously with impartation of the coloring material and, therefore, the latex compound may be added to a place in an image receiving paper, or may be imparted into an ink, or a liquid material of the polymer latex alone may be used. Specifically, methods described in JP-A Nos. 2002-166638, 2002-121440, 2002-154201, 2002-144696, and 2002-080759 may be preferably used.

One example of the image forming system preferable in the invention includes an image forming method including the following steps.

First step: a step of imparting a liquid composition improving printability to a recording medium.

Second step: a step of imparting a water-based ink composition to the recording medium with the liquid composition imparted thereto.

Other steps: Other steps are not particularly limited, and may be appropriately selected depending on the purpose, and examples include a drying and removing step, and a heat fixation step.

The drying and removing step is not particularly limited as far as it may dry and remove at least a part of an ink solvent in the ink composition imparted to a recording medium, and may be arbitrarily selected depending on the purpose. In addition, the heat fixing step is not particularly limited as far as it may melt and fix a latex particle contained in the ink composition, and may be arbitrarily selected depending on the purpose.

Another example of the image forming system preferable in the invention includes an image forming method including the following steps.

First step: a step of imparting a liquid composition for improving printability to an intermediate transfer body.

Second step: a step of imparting an ink of the ink set to the intermediate transfer body with the liquid composition imparted thereto.

Third step: a step of transferring an ink image formed on the intermediate transfer body onto a recording medium.

Other steps: Other steps are not particularly limited, but may be arbitrarily selected depending on the purpose, and examples include the drying and removing step, and the heat fixing step.

EXAMPLES

The invention is explained hereinafter in detail by way of examples, while the scope of the invention is not limited thereto. The "part(s)" or "%" are mass-based units unless specifically defined otherwise.
(Preparation of Self-dispersing Polymer)
-Preparation of Self-dispersing Polymer (B-01)-

A 2 litter three-neck flask equipped with a stirrer, a thermometer, a refluxing condenser, and a nitrogen gas introducing tube was charged with 540.0 g of methyl ethyl ketone, and a temperature inside the flask was raised to 75° C. A mixed solution consisting of 108 g of methyl methacrylate, 388.8 g of isobornyl methacrylate, 43.2 g of methacrylic acid, 108 g of methyl ethyl ketone, and 2.16 g of "V-601 " (trade name, manufactured by Wako Pure Chemical Industries, Ltd.) was added dropwise at a constant rate so that addition was completed in 2 hours, while a temperature in the reaction vessel was maintained at 75° C. After completion of addition, a solution consisting of 1.08 g of "V-601", and 15.0 of methyl ethyl ketone was added, the mixture was stirred at 75° C. for 2 hours, a solution consisting of 0.54 g of "V-601" and 15.0 g of methyl ethyl ketone was further added, the mixture was stirred at 75° C. for 2 hours, a temperature was raised to 85° C., and stirring was continued further for 2 hours.

The weight average molecular weight (Mw) of the resulting copolymer was 61000 (calculated in terms of polystyrene by gel permeation chromatography (GPC); column used was TSKgel SuperHZM-H, TSKgel SuperHZ4000, TSKgel SuperHZ200 (trade name, manufactured by Tohso)), and the acid value was 52.1 (mgKOH/g).

Then, 588.2 g of a polymerization solution was weighed, 165 g of isopropanol, and 120.8 ml of a 1 mol/L NaOH aqueous solution were added, and a temperature in the reaction vessel was raised to 80° C. Then, 718 g of distilled water was added dropwise at a rate of 20 ml/min, and the materials were dispersed in water. Thereafter, a temperature in the reaction vessel was maintained at 80° C. for 2 hours, at 85° C. for 2 hours, and at 90° C. for 2 hour the atmospheric pressure to distill off the solvent. Further, a pressure in the reaction vessel was reduced to distill off isopropanol, methyl ethyl ketone, and distilled water to obtain an aqueous dispersion of a self-dispersing polymer (B-01) having the solid matter concentration of 26.0%.

The number of each constituent unit of the following exemplified compound (B-01) represents a mass ratio. This is also similar in each structural formula hereinafter.

B-01: Methyl methacrylate/isobornyl methacrylate/methacrylic acid copolymer (20/72/8)

-Preparation of Self-dispersing Polymers (B-02) to (B-13)-

According to a similar manner to that in Example 1 except that a mixing ratio of each monomer was changed so that a mass ratio of the following exemplified compound was obtained, in place of 108 g of methyl methacrylate, 388.8 g of isobornyl methacrylate, and 43.2 g of methacrylic acid in the synthesis of (B-01) of Example 1, the following exemplified self-dispersing polymers (B-02) to (B-13) were obtained. Physical properties of the resulting (B-02) to (B-13) are shown in Table 1. In any case, with respect to a neutralization degree of the self-dispersing polymer, an amount of a NaOH aqueous solution (1 mol/L) was adjusted so that it became 65 mol % relative to 1 mole of a dissociative group.

B-02: Methyl methacrylate/isobornyl methacrylate/benzyl methacrylate/methacrylic acid copolymer (30/50/14/6)

B-03: Methyl methacrylate/dicyclopentanyl methacrylate/methacrylic acid copolymer (40/50/10)

B-04: Methyl methacrylate/dicyclopentanyl methacrylate/phenoxyethyl methacrylate/methacrylic acid copolymer (30/50/14/6)

B-05: Methyl methacrylate/isobornyl methacrylate/methoxypolyethylene glycol methacrylate (n=2)/methacrylic acid copolymer (30/54/10/6)

B-06: Methyl methacrylate/dicyclopentanyl methacrylate/methoxypolyethylene glycol methacrylate (n=2)/methacrylic acid copolymer (54/35/5/6)

B-07: Methyl methacrylate/adamantyl methacrylate/methoxypolyethylene glycol methacrylate (n=23)/methacrylic acid copolymer (30/50/15/5)

B-08: Methyl methacrylate/isobornyl methacrylate/dicyclopentanyl methacrylate/methacrylic acid copolymer (20/50/22/8)

B-09: Ethyl methacrylate/cyclohexyl methacrylate/acrylic acid copolymer (50/45/5)

B-10: Isobutyl methacrylate/cyclohexyl methacrylate/acrylic acid copolymer (40/50/10)

B-11: n-Butyl methacrylate/cyclohexyl methacrylate/styrene/acrylic acid copolymer (30/55/10/5)

B-12: Methyl methacrylate/dicyclopentenyloxyethyl methacrylate/methacrylic acid copolymer (40/52/8)

B-13: Lauryl methacrylate/dicyclopentenyloxyethyl methacrylate/methacrylic acid copolymer (25/63/12)

-Preparation of Polymer Dispersion BH-01-

According to Production Example of a polymer described in paragraph numbers [0083] to [0087] of JP-A No. 2001-329199, Comparative compound was synthesized. Further, according to Preparation Example of a polymer dispersion described in paragraph numbers [0099] to [0100] of the publication, Comparative compound (BH-01) was obtained. Physical properties of the resulting (BH-01) are shown in Table 1.

BH-01: Styrene/lauryl methacrylate/methoxypolyethylene glycol (n=9) methacrylate/hydroxyethyl methacrylate/styrene macromer/silicon macromer/acrylic acid copolymer (28/28/10/15/10/2/7)

-Preparation of Polymer Dispersion BH-02-

According to Production Example of a polymer dispersion described in paragraph numbers [0051] to [0053] of JP-A No. 2006-273892, the following exemplified compound BH-02 (polymer dispersion BH-02) was obtained. Physical properties of the resulting (BH-02) are shown in Table 1.

BH-02: styrene/benzyl methacrylate/polyethylene glycol monomethacrylate (n=15)/polypropylene glycol monomethacrylate (n=9)/styrene macromer/methacrylic acid copolymer (30/10/20/15/10/15)

In production of BH-01, and BH-02, AS-6 (trade name, manufactured by Toagosei Co., Ltd.) was used as the styrene macromer. In production of BH-01, silicon macromer (trade name: FM-0711, manufactured by Chisso Corporation) was used as the silicon macromer.

In Table 1, the particle diameter is the average particle diameter, and is a value measured according to the conventional method using Micro Track UPA EX-150 (trade name, manufactured by Nikkiso Co., Ltd.). Concerning the pH, results evaluated according to the following evaluation criteria are described.

-Evaluation Criteria-

A . . . Less than 8.5

B . . . 8.5 or more and less than 9

C . . . 9 or more and less than 9.5

D . . . 9.5 or more

In addition, a dispersion stability acceleration test in Table 1 was performed as follows.

First, a polymer dispersion was prepared so that the solid matter became 25%. The prepared 25% polymer dispersion was charged into a centrifugation tube, this was centrifuged with a high speed large volume cooling centrifuge manufactured by Kubota Corporation at a rotation number of 12000 rpm, at 10° C. for 60 minutes, and the supernatant was recovered.

Then, the solid matter mass of a liquid recovered by centrifugation was measured. In a measurement method, 500 mg to 600 mg of a liquid recovered by centrifugation was weighed into an aluminum cup having the diameter of 1.5 cm, followed by heating in a vacuum dryer at 120° C. for 30 minutes under the atmospheric pressure, then allowed to stand at 120° C. for 2 hours under reduced pressure (vacuum degree: 0.1 MPa or lower), and then the mass of the solid matter was measured. The amount of the solid matter after centrifugation was divided by the amount of the solid mater before centrifugation to calculate a ratio, and this was evaluated according to the following evaluation criteria.

-Evaluation Criteria-

A . . . Ratio is 0.95 or more.

B . . . Ratio is 0.90 or more and less than 0.95.

C . . . Ratio is 0.80 or more and less than 0.90.

D . . . Ratio is less than 0.80.

TABLE 1

| | Weight average molecular weight | Acid value (mgKOH/g) | Particle diameter (nm) | pH | Dispersion stability acceleration test |
|---|---|---|---|---|---|
| B-01 | 61,000 | 52.1 | 20 | A | A |
| B-02 | 68,000 | 39.1 | 25 | A | A |
| B-03 | 82,000 | 65.2 | 15 | A | A |
| B-04 | 54,000 | 39.1 | 35 | A | A |
| B-05 | 123,000 | 39.1 | 20 | A | A |
| B-06 | 76,000 | 39.1 | 20 | A | A |
| B-07 | 45,000 | 32.6 | 30 | A | A |
| B-08 | 90,000 | 52.1 | 25 | A | A |
| B-09 | 48,000 | 38.9 | 50 | B | B |
| B-10 | 52,000 | 77.8 | 40 | B | A |
| B-11 | 32,000 | 38.9 | 60 | B | C |
| B-12 | 85,000 | 52.1 | 30 | B | A |
| B-13 | 115,000 | 78.2 | 60 | C | C |
| BH-01 | 28,000 | 54.5 | 70 | C | D |
| BH-02 | 300,000 | 97.8 | 60 | D | C |

[Preparation of Water-based Ink Composition]

<<Preparation of Cyan Ink C-01>>

(Synthesis of Water-insoluble Polymer Dispersant)

A mixed solution of 6 parts of styrene, 11 parts of stearyl methacrylate, 4 parts of styrene macromer (trade name: AS-6, manufactured by Toagosei Co., Ltd.), 5 parts of Blemmer PP-500 (manufactured by NOF), 5 parts of methacrylic acid, 0.05 parts of 2-mercaptoethanol, and 24 parts of methyl ethyl ketone was prepared and placed in a reaction vessel.

Separately, a mixed solution consisting of 14 parts of styrene, 24 parts of stearyl methacrylate, 9 parts of styrene macromer (trade name: AS-6, manufactured by Toagosei Co., Ltd.), 9 parts of Blemmer PP-500 (trade name, manufactured by NOF), 10 parts of methacrylic acid, 0.13 parts of 2-mercaptoethanol, 56 parts of methyl ethyl ketone and 1.2 parts of 2,2'-azobis(2,4-dimethylvaleronitrile) was prepared, and placed in a dropping funnel.

Then, a temperature inside the reaction vessel was raised to 75° C. while the mixed solution in the reaction vessel was stirred under the nitrogen atmosphere, and the mixed solution in the dropping funnel was gradually added dropwise over 1 hour. After 2 hours from completion of the addition, a solution obtained by dissolving 1.2 parts of 2,2'-azobis(2,4-dimethylvaleronitrile) in 12 parts by mass of methyl ethyl ketone was added dropwise over 3 hours, and this was aged at 75° C. for 2 hours, and at 80° C. for 2 hours to obtain a methyl ethyl ketone solution of a water-insoluble polymer dispersant.

A part of the resulting water-insoluble polymer dispersant solution was isolated by removing the solvent, the resulting solid matter was diluted with tetrahydrofuran to 0.1% by mass, and the weight average molecular weight was measured by GPC. As a result, the isolated solid matter had the weight average molecular weight in terms of polystyrene of 25,000.

(Preparation of Cyan Pigment Dispersion)

To a vessel were supplied 5.0 g (in terms of solid matter) of the resulting water-insoluble polymer dispersant solution, 10.0 g of a cyan pigment (trade name: Pigment Blue 15:3, manufactured by Dainichiseika Color & Chemicals Mfg. Co., Ltd.), 40.0 g of methyl ethyl ketone, 8.0 g of 1 mol/L sodium hydroxide, 82.0 g of ion-exchanged water, and 300 g of 0.1 mm zirconia beads, and the mixture was dispersed with a dispersing machine (trade name: Ready Mill manufactured by IMEC) at 1000 rpm for 6 hours. The resulting dispersion was concentrated under reduced pressure until methyl ethyl ketone was sufficiently distilled off with an evaporator. The pigment concentration was adjusted to 10%, to obtain a cyan dispersion C1 as a dispersion of a colored particle consisting of a pigment having a surface covered with the water-insoluble polymer dispersant. The average particle diameter of the resulting cyan pigment dispersion C1 was 77 nm.

Then, using the cyan pigment dispersion C1, and B-01 as an aqueous dispersion of the self-dispersing polymer particles, and water, Sannix GP250 (trade name, manufactured by Sanyo Chemical Industries, Ltd.), and diethylene glycol monoethyl ether (manufactured by Wako Pure Chemical Industries, Ltd.) as a water-based medium, an ink was prepared so that the following ink composition was obtained. After preparation of the ink, coarse particles were removed with a 5 μm filter to prepare a cyan ink C-01 as a water-based ink composition.

<Ink Composition of Cyan Ink C-01>

| | |
|---|---|
| Cyan pigment (trade name: Pigment Blue 15:3, manufactured by Dainichiseika Color & Chemicals Mfg. Co., Ltd.) | 4% |
| Water-insoluble polymer dispersant | 2% |
| B-01 (in terms of solid matter) | 8% |
| Sannix GP250 | 10% |
| Diethylene glycol monoethyl ether | 5% |
| Olfine E1010 (trade name, manufactured by Nissin Chemical Industry Co., Ltd.) | 1% |
| Ion-exchanged water | add to be 100% in total |

In the above, the measurement of the average particle diameter was performed by suitably diluting the concentration of the dispersion to a concentration suitable for the measurement with the Microtruck UPA EX-150 (described above) under the same measurement conditions. More specifically, the volume average particle diameter was measured under the conditions of: particle transmission being transmittable; particle refractive index being 1.51; particle shape being non spherical; density being 1.2 g/cm$^3$; solvent being water; and cell temperature being from 18° C. to 25° C. Moreover, the viscosity was measured with a DV-II+VIS-COMETER (trade name, manufactured by BROOKFIELD). Moreover, the surface tension was measured with a platinum plate method using a CBVP-Z (trade name, manufactured by Kyowa Interface Science Co., LTD.).

<<Preparation of Cyan Inks C-02 to C-13, CH-01 to CH-03>>

According to a similar manner to that in the preparation of the cyan ink C-01 except that self-dispersing polymer particles shown in the following Table 2 were used, respectively, in place of the self-dispersing polymer particle B-01 in preparation of the cyan ink C-01, cyan inks C-02 to C-13, and CH-01 to CH-02 of the water-based ink composition were prepared, respectively.

Separately, according to a similar manner to that in the preparation of the cyan ink C-01 except that the self-dispersing polymer particle was not used, a cyan ink CH-03 of the water-based ink composition was prepared.

<<Preparation of Cyan Ink C-14>>

In the preparation of the cyan ink C-01, using a cyan dispersion C1 as the dispersion of colored particles including a pigment and a water-insoluble polymer dispersant, and B-01 as the dispersion of self-dispersing polymer particles, and using water, glycerin, and diethylene glycol as the water-based medium, an ink was prepared so that the following ink composition was obtained. After preparation of the ink, coarse particles were removed using a 5 μm filter to prepare a cyan ink C-14 as the water-based ink composition.

<Ink Composition of Cyan Ink C-1>

| | |
|---|---|
| Cyan pigment (trade name: Pigment Blue 15:3, manufactured by Dainichiseika Color & Chemicals Mfg. Co., Ltd.) | 4% |
| Water-insoluble polymer dispersant | 2% |
| B-01 (in terms of solid matter) | 8% |
| Diethylene glycol (Wako Pure Chemical Industries, Ltd.) | 10% |
| Glycerin | 20% |
| Olfine E1010 (manufactured by Nissin Chemical Industry Co., Ltd.) | 1% |
| Ion-exchanged water | add to be 100% in total |

<<Preparation of Yellow Ink CH-04>>

Using Oil Yellow 129 manufactured by Orient Chemical Industries, Ltd. as a hydrophobic dye, and according to Production Example 1 of an aqueous ink described in paragraph numbers [0054] to [0062] of JP-A No. 2004-203996, a colored particle consisting of a hydrophobic dye, and a water-insoluble vinyl polymer having a structure derived from alicyclic (meth)acrylate was prepared.

Further, using water, Sannix GP250 (trade name, Sanyo Chemical Industries, Ltd.), and diethylene glycol monoethyl ether (Wako Pure Chemical Industries, Ltd.) as a water-based medium, an ink was prepared so that the following ink composition was obtained. After preparation of the ink, coarse particles were removed using a 5 μm filter to prepare a yellow ink CH-04 as the water-based ink composition.

<Ink Composition of Yellow Ink CH-04>

| | |
|---|---|
| Hydrophobic dye (Oil Yellow 129) | 4% |
| Water-insoluble polymer | 4% |
| Sannix GP250 | 10% |
| Diethylene glycol monoethyl ether | 5% |
| Olfine E1010 (trade name, manufactured by Nissin Chemical Industry Co., Ltd.) | 1% |
| Ion exchanged water | add to be 100% in total |

(Preparation of Treating Liquid)

Each component was mixed so that the following composition was obtained, thereby, a treating liquid was prepared.

-Composition of Treating Liquid-

| | |
|---|---|
| Malonic acid (manufactured by Wako Pure Chemical Industries, Ltd.) | 15.0% |
| Diethylene glycol monomethyl ether (manufactured by Wako Pure Chemical Industries, Ltd.) | 20.0% |
| N-oleoyl-N-methyltaurine sodium (surfactant) | 1.0% |
| Ion-exchanged water | 64.0% |

Physical property values of the treating liquid were measured, and the viscosity was found to be 2.6 mPa·s, the surface tension was found to be 37.3 mN/m and the pH was found to be 1.6.

Measurement of the surface tension was performed under the condition of 25° C. using Automatic Surface Tensiometer (trade name, CBVP-Z manufactured by Kyowa Interface Science Co., Ltd.), and measurement of the viscosity was performed under the condition of 20° C. using VISCOMETER TV-22 (trade name, manufactured by TOKI SANGYO Co., Ltd.) and, the pH was measured at 25° C.

[Evaluation] Regarding the thus prepared each cyan ink (hereinafter, simply referred to as "ink" in some cases), an ink droplet ejection stability test, a re-ejection property test, an image fixation test, and a blocking resistance test were performed. Results are shown in Table 2.

(Droplet Ejection Stability)

An ink was charged into a cartridge (trade name: GELJETG717, manufactured by Ricoh), and droplets of the ink were ejected to Tokubishi Both Side Art N (trade name, manufactured by Mitsubishi Paper Mills Limited) using a printer head (trade name: GELJETG717, manufactured by Ricoh) so that a resolution degree became 1200 dpi×600 dpi, and an ink droplet ejection amount became 12 pL. By continuously performing droplet ejection, and observing the state after 5 hours, droplet ejection stability was evaluated according to the following criteria.

-Evaluation Criteria-
A . . . No ejection defect
B . . . Little ejection defect is seen, at a practically no problematic level.
C . . . Ejection defect is seen, at a practical limit level.
D . . . Ejection defect is much, at a practically problematic level.

(Re-ejection Property)

An ink was charged into a cartridge (trade name: GELJETG717, manufactured by Ricoh), and droplets of the ink were ejected to Tokubishi Both Side Art N (trade name, manufactured by Mitsubishi Paper Mills Limited) using a printer head (trade name: GELJETG717, manufactured by Ricoh) so that a resolution degree became 1200 dpi×600 dpi, and an ink droplet ejection amount became 12 pL.

According to the following items and criteria, re-ejection property was evaluated.

-Evaluation Item-
(i) When image unevenness is not seen, it is determined to be good.
(ii) When after continuous ejection for 1 minute, the sample is allowed to stand uncapping for 30 minutes, and the ink is re-ejected, the ejection rate of 90% or more (unejection rate is less than 10%) is determined to be good.
(iii) The ejection rate after continuous ejection for 60 minutes of 90% or more (unejection rate is less than 10%) is determined to be good.

-Evaluation Criteria-
A . . . All of (i) to (iii) are satisfied.
B . . . Two items of (i) and (ii) are satisfied.
C . . . Only (i) is satisfied.
D . . . None of (i) to (iii) is satisfied.

(Fixability)

-Scratch Resistance-

Tokubishi Both Side Art N (trade name, recording medium, manufactured by Mitsubishi Paper Mills Limited) was fixed on a stage moving at 500 mm/sec, a treating liquid was coated thereon using a wire bar coater at a thickness of about 2.5 μm, and this was immediately dried at 50° C. for 2 seconds. Thereafter, a cyan plain image was printed with a printer head (trade name: GELJET GX5000, manufactured by Ricoh) which had been arranged and fixed aslant relative to a scanning direction in a line system at a resolution degree of 1200 dpi×600 dpi and a droplet ejection amount of 3.5 pL.

Immediately after printing, the sample was dried at 60° C. for 3 seconds, passed between one pair of fixing rollers heated at 60° C., and fixation was performed at a nip pressure of 0.25 MPa and a nip width of 4 mm to prepare a printed sample.

An unprinted Tokubishi Both Side Art N manufactured by Mitsubishi Paper Mills Limited) was wound around a paperweight (weight 470 g, size 15 mm×30 mm×120 mm) (an area in which unprinted Tokubishi Art and an evaluation sample were contacted is 150 $mm^2$), and the printed sample was rubbed three reciprocations (corresponding to a load of 260 $kg/M^2$). A printed surface after rubbing was observed visually, and evaluated according to the following evaluation criteria.

-Evaluation Criteria-
A . . . Peeling of image (coloring material) is not visually seen on a printed surface.
B . . . Slight peeling of an image (coloring material) is recognized on a printed surface.
C . . . Peeling of an image (coloring material) is visually observed on a printed surface, at a practically problematic level.

(Blocking Resistance)

Tokubishi Both Side Art N (trade name, recording medium, manufactured by Mitsubishi Paper Mills Limited) was fixed on a stage moving at 500 mm/sec, a treating liquid was coated thereon using a wire bar coater at a thickness of about 2.5 μm, and this was immediately dried at 50° C. for 2 seconds. Thereafter, a cyan plain image was printed with a printer head (trade name: GELJET GX5000, manufactured by Ricoh) which had been arranged and fixed aslant relative to a scanning direction in a line system at a resolution degree of 1200 dpi×600 dpi and a droplet ejection amount of 3.5 pL.

Immediately after printing, the sample was dried at 60° C. for 3 seconds, passed between one pair of fixing rollers heated at 60° C., and fixation was performed at a nip pressure of 0.25 MPa and a nip width of 4 mm to prepare a printed sample.

The printed sample was cut into 3.5 cm×4 cm. The printed sample was placed on an acrylic plate having a size of 10 cm×10 cm, and on the sample were placed 10 sheets of Tokubishi Both Side Art N (manufactured by Mitsubishi Paper Mills Limited) cut into the same size as the sample and further thereon was placed another acrylic plate having a size of 10 cm×10 cm. This was allowed to stand for 12 hours under the conditions of a temperature of 50° C. and a humidity of 60%, thereafter, a 1 kg balance weight was placed on the acrylic plate, and allowed to stand for 24 hours (corresponding to a load of 700 $kg/m^2$). Further, this was stored for 2 hours under the environment of 25° C. and 50% RH, Tokubishi Art was peeled from the printed sample, and blocking resistance was evaluated according to the following evaluation criteria.

-Evaluation Criteria-
A . . . Art is naturally peeled.
B . . . When Art is peeled, there is a resistance, but color transfer onto a sample is not observed.
C . . . Some color transfer is observed, at a practical limitation level.
D . . . Color transfer is observed on around 50% of a printed part, at a practically problematic level.

TABLE 2

| Ink | Polymer particle | Droplet ejection stability | Re-ejection property | Fixability | Blocking resistance |
|---|---|---|---|---|---|
| C-01 | B-01 | A | A | A | A |
| C-02 | B-02 | A | A | A | A |
| C-03 | B-03 | A | A | A | A |
| C-04 | B-04 | A | A | A | A |
| C-05 | B-05 | A | A | A | A |
| C-06 | B-06 | A | A | A | A |
| C-07 | B-07 | A | A | A | A |
| C-08 | B-08 | A | A | A | A |
| C-09 | B-09 | B | B | A | B |
| C-10 | B-10 | B | B | A | B |
| C-11 | B-11 | B | B | A | C |
| C-12 | B-12 | A | B | A | B |
| C-13 | B-13 | C | C | A | C |
| C-14 | B-01 | B | B | B | A |
| CH-01 | BH-01 | C | C | A | D |
| CH-02 | BH-02 | C | C | B | D |
| CH-03 | — | B | B | C | D |
| CH-04 | — | C | D | B | C |

As seen from Table 2, the water-based ink composition of the invention was good in droplet ejection stability, and ejection property such as re-ejection property and, additionally, was also good in scratch resistance and blocking resistance.

On the other hand, when conventionally known polymer dispersion was used, droplet ejection stability and re-ejection property were inferior as compared with the water-based ink composition of the invention, and blocking resistance was particularly inferior.

In addition, in Comparative Ink CH-03 with no polymer dispersion added thereto, ejection property was relatively good, but scratch resistance and blocking resistance were greatly inferior. In addition, the aqueous ink containing the colored particle consisting of a hydrophobic dye, and a vinyl polymer having a structure derived from alicyclic (meth)acrylate was greatly inferior in performance, as compared with the water-based ink composition of the invention.

From the forgoing, it is seen that according to an aspect of the invention, a water-based ink composition having excellent droplet ejection stability, re-ejection property, fixability, and blocking resistance which have not previously been observed, may be provided.

The invention includes the following embodiments.
<1>
A water-based ink composition including:
a water-based medium,
a colored particle containing a pigment and a water-insoluble polymer dispersant, and
a self-dispersing polymer particle containing a hydrophilic constituent unit, and a hydrophobic constituent unit derived from alicyclic (meth)acrylate.
<2>
The water-based ink composition of <1>, wherein the self-dispersing polymer particle is a self-dispersing polymer particle in which the number of carbon atoms of an alicyclic hydrocarbon part of the alicyclic (meth)acrylate is 5 to 20.
<3>
The water-based ink composition of <1>, or <2>, wherein the self-dispersing polymer particle is a self-dispersing polymer particle in which the alicyclic (meth)acrylate is at least one kind of dicyclic (meth)acrylate or tri- or higher cyclic (meth)acrylate.
<4>
The water-based ink composition of <3>, wherein the self-dispersing polymer particle is a self-dispersing polymer particle in which the alicyclic (meth)acrylate is at least one kind selected from isobornyl (meth)acrylate, adamantyl (meth)acrylate, and dicyclopentanyl (meth)acrylate.
<5>
The water-based ink composition of any one of <1> to <4>, wherein the self-dispersing polymer particle is a self-dispersing polymer particle in which the content of the constituent unit derived from the alicyclic (meth)acrylate is 20% by mass or more and 90% by mass or less in the polymer.
<6>
The water-based ink composition of any one of <1> to <5>, wherein the self-dispersing polymer particle further includes a constituent unit derived from (meth)acrylate having a chain alkyl group having 1 to 8 carbon atoms as a hydrophobic constituent unit.
<7>
The water-based ink composition of any one of <1> to <6>, wherein in the self-dispersing polymer particle, the content of a constituent unit derived from a styrene-based monomer is 20% by mass or less.
<8>
The water-based ink composition of any one of <1> to <7>, wherein the self-dispersing polymer particle comprises a constituent unit having a carboxy group as a hydrophilic constituent unit.
<9>
The water-based ink composition of any one of <1> to <8>, wherein the acid value (KOH mg/g) of the self-dispersing polymer is 25 or more and 100 or less.
<10>
The water-based ink composition of <1>, wherein the average particle diameter of the self-dispersing polymer particle is 5 to 60 nm.
<11>
The water-based ink composition of any one of <1> to <10>, wherein the water-based ink composition is an ink for inkjet recording.
<12>
An ink set including the water-based ink composition as defined in any one of <1> to <11>.
<13>
A method for forming an image including using the water-based ink composition as defined in any one of <1> to <11>, or the ink set as defined in <12> to impart the water-based ink composition to a recording medium.

All publications, patent applications, and technical standards mentioned in this specification are herein incorporated by reference to the same extent as if each individual publication, patent application, or technical standard was specifically and individually indicated to be incorporated by reference.

What is claimed is:

1. A water-based ink composition comprising:
a water-based medium,
a colored particle containing a pigment and a water-insoluble polymer dispersant, and
a self-dispersing polymer particle containing a hydrophilic constituent unit, and a hydrophobic constituent unit derived from alicyclic (meth)acrylate, wherein
in the self-dispersing polymer particle, the content of the constituent unit derived from a styrene-based monomer is 10% by mass or less, the self-dispersing polymer particle is present in a form containing substantially no pigment, and the acid value (KOH mg/g) of the self-dispersing polymer is 25 to 100.

2. The water-based ink composition of claim 1, wherein the self-dispersing polymer particle is a self-dispersing polymer particle in which the number of carbon atoms of an alicyclic hydrocarbon part of the alicyclic (meth)acrylate is 5 to 20.

3. The water-based ink composition of claim 1, wherein the self-dispersing polymer particle is a self-dispersing polymer particle in which the content of the constituent unit derived from alicyclic (meth)acrylate is 20% by mass to 90% by mass in the polymer.

4. The water-based ink composition of claim 1, wherein the self-dispersing polymer particle further comprises a constituent unit derived from (meth)acrylate having a chain alkyl group having 1 to 8 carbon atoms as a hydrophobic constituent unit.

5. The water-based ink composition of claim 1, wherein the self-dispersing polymer particle comprises a constituent unit having a carboxy group as the hydrophilic constituent unit.

6. The water-based ink composition of claim 1, wherein the average particle diameter of the self-dispersing polymer particle is 5 nm to 60 nm.

7. The water-based ink composition of claim 1, wherein the water-based ink composition is an ink for inkjet recording.

8. The water-based ink composition of claim 1, wherein in the self-dispersing polymer particle, the content of the constituent unit derived from the styrene-based monomer is 5% by mass or less.

9. The water-based ink composition of claim 1, wherein in the self-dispersing polymer particle, the content of the constituent unit derived from the styrene-based monomer is 0% by mass or less.

10. The water-based ink composition of claim 1, wherein the water-based medium contains a water-soluble solvent having a solubility parameter (SP value) of 27.5 or less at 90% by mass or more based on the entire water-soluble solvent, and at least one kind of compound represented by the following structure formula (1),

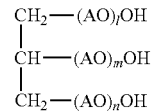

Structural Formula (1)

wherein l, m and n are each independently an integer of 1 or more, and represents l+m+n=3 to 15, AO represents ethyleneoxy (EO) and/or propyleneoxy (PO), and each AO in the $(AO)_l$, $(AO)_m$ and $(AO)_n$ may be each the same or different.

11. The water-based ink composition of claim 1, wherein the self-dispersing polymer particle is a self-dispersing polymer particle in which the alicyclic (meth)acrylate is at least one of dicyclic (meth)acrylate or tri- or higher cyclic (meth)acrylate.

12. The water-based ink composition of claim 11, wherein the self-dispersing polymer particle is a self-dispersing polymer particle in which the alicyclic (meth)acrylate is at least one selected from isobornyl (meth)acrylate, adamantyl (meth)acrylate, or dicyclopentanyl (meth)acrylate.

13. An ink set comprising the water-based ink composition as defined in claim 1.

14. A method for forming an image, comprising using the water-based ink composition as defined in claim 1, or an ink set comprising the water-based ink composition as defined in claim 1 to impart the water-based ink composition to a recording medium.

* * * * *